(12) United States Patent
Hargis

(10) Patent No.: US 6,854,942 B1
(45) Date of Patent: Feb. 15, 2005

(54) SEALING FASTENER WITH MULTIPLE THREADS

(75) Inventor: Joe A. Hargis, Tyler, TX (US)

(73) Assignee: Hargis Industries, L.P., Tyler, TX (US)

(*) Notice: Subject to any disclaimer, the term of this patent is extended or adjusted under 35 U.S.C. 154(b) by 16 days.

(21) Appl. No.: 10/422,097

(22) Filed: Apr. 25, 2003

Related U.S. Application Data

(60) Provisional application No. 60/449,122, filed on Feb. 24, 2003.

(51) Int. Cl.[7] ............................ F16B 33/00; F16B 35/06
(52) U.S. Cl. .................... 411/369; 411/371.1; 411/399; 411/412; 411/533
(58) Field of Search ........................... 411/369, 371.1, 411/399, 412, 413, 533, 542

(56) References Cited

U.S. PATENT DOCUMENTS

| | | | | |
|---|---|---|---|---|
| 3,153,971 A | * | 10/1964 | Lovisek | 411/371.1 |
| 3,882,752 A | * | 5/1975 | Gutshall | 411/371.1 |
| 5,433,570 A | * | 7/1995 | Koppel | 411/413 X |
| 5,779,417 A | * | 7/1998 | Barth et al. | 411/412 |
| 6,045,312 A | * | 4/2000 | Hsing | 411/412 |

* cited by examiner

Primary Examiner—Neill Wilson
(74) Attorney, Agent, or Firm—Walter D. Ames, Esq.

(57) ABSTRACT

A screw having a primary thread extending along its shank and terminating at the screw head is formed with a supplemental thread extending between adjacent convolutions of the primary thread and also terminating at the head of the screw. The spaced termini of the two threads maintain a washer at the head in a position perpendicular to the axis of the shank of the screw.

12 Claims, 1 Drawing Sheet

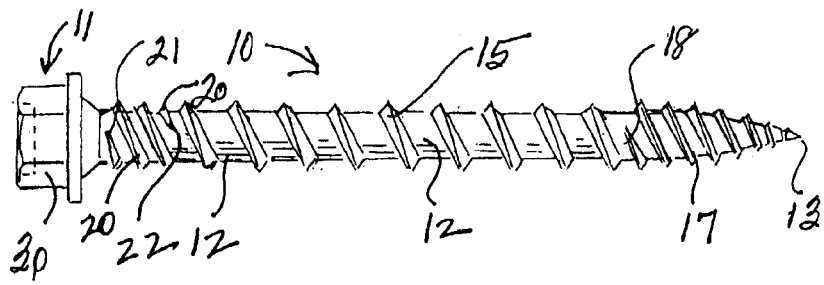
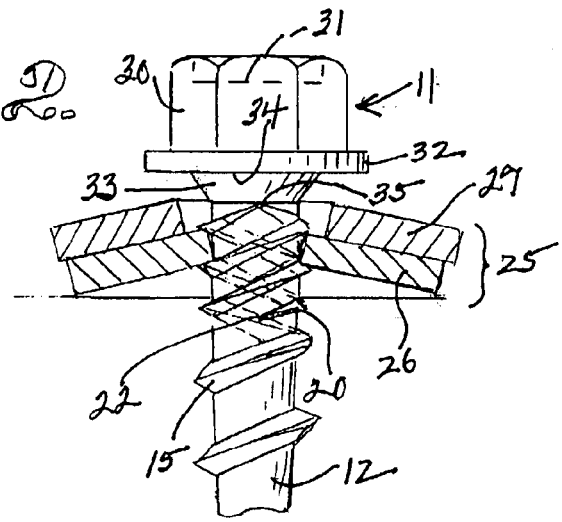
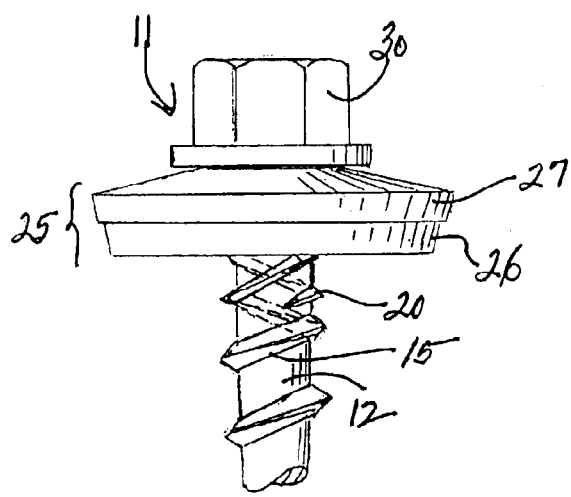

US 6,854,942 B1

SEALING FASTENER WITH MULTIPLE THREADS

CROSS-REFERENCE TO RELATED APPLICATIONS

This application claims the benefit of Provisional Application 60/449,122 filed Feb. 24, 2003.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

FIELD OF THE INVENTION

The present invention relates in general to threaded fasteners, often referred to as screws, and more particularly to such fasteners as are utilized to secure two objects together and employ a washer or gasket to prevent the ingress of water or other contaminants into the orifice formed when the fastener penetrates the objects to be joined.

BACKGROUND OF THE INVENTION

The structure of fasteners, and particularly screws, is a highly developed art. For many years screws have been formed with specific thread formations that have permitted them to better perform specific tasks. Thus, screws have been developed for the specific purpose of securing gypsum wallboard to wooden studs, such fasteners being known as dry wall screws, and such screws possess threads of varying convolutions. As an example, U.S. Pat. No. 3,703,843 to Laverty describes such a screw said to have increased holding power. The screw is formed with a thread extending from the screw head to the tapered point. A second thread extends uniformly along the fastener shank between the convolutions of the first thread from the point to a location less than one-half of the distance from the point to the head. According to Laverty, the multiple threads facilitate entry into the material being pierced, while the later encountered single thread eases passage of the screw into the material once initial entry has been accomplished. In other prior art threaded fasteners are disclosed in which the threads have different pitches and even different directions of spiraling.

In the use of many threaded fasteners, either the fastener, itself, forms an orifice in the objects being joined, in which case the screw is said to be self-drilling, or the fastener shank is positioned in a preformed hole that extends through the objects; In either instance, unless some means is provided for sealing against ingress of the elements, and specifically water, into the orifice through which the fastener shank passes, water will enter the hole and cause corrosion or galvanic activity, either of which is highly deleterious to the stability of the juncture over time. Thus, in an effort to seal the orifice from the elements, it has become commonplace to provide a washer or gasket at the head of the screw, and generally the inner surface of the screw head is shaped to present a surface against which the washer seats to effect a seal between the screw head and the surfaces of the structures being joined.

As the use of a washer to underlie the head of each fastener has become prosaic, it is also commonplace for fasteners to be shipped to the building site with each screw having a washer loosely attached to it, thereby saving the time of a workman having to extract fasteners and washers from separate containers and thread the shank of each screw through a washer before forming an aperture with the fastener if the screw is self-drilling. As with many labor intensive operations in erecting a building, utilizing pre-threaded fasteners can effect significant temporal savings.

Nevertheless, the problem has then arisen as to how to maintain a rubber washer that is loose fitting and is not attached to the screw in position on the screw shank adjoining or contiguous with the head of the screw so that, despite normal handling both in shipment and in the field, the washer will be retained in position adjacent to the screw head so that the screw can be drilled in place with minimum effort and with the washer positioned to effect its sealing function.

It is, therefore, a primary object of the present invention to provide a metal fastener, namely, a screw of such configuration that a washer will be maintained at least loosely in place at the screw head in normal handling of the screw and washer during shipment and at the job site.

It is a further object of my invention to provide the combination of a washer and a screw in which the washer is threaded onto the shank of the screw to a position adjacent the screw head and maintained in that position despite moderate jostling of the screw-washer combination.

BRIEF SUMMARY OF THE INVENTION

In essence, my invention maintains a washer in position adjacent to the head of a fastener with which it will cooperate to seal the orifice in which the fastener is positioned, by providing a supplemental thread on a portion of the screw shank adjacent to the head, in addition to and between the convolutions of the primary thread of the fastener. As the primary thread terminates in what is called a primary terminus at the head, and the supplemental thread also terminates at the head with a supplemental terminus spaced from the primary terminus along the periphery of the shank, a washer positioned at the head of the screw will be maintained in that position by two, spaced termini, rather than a single terminus such as that present in conventional screws.

My invention takes the form of both the screw per se, and the combination of a screw and a washer, most advantageously a resilient washer, mounted on the screw shank adjacent the head of the screw. In more specific embodiments the termini of the primary and supplemental threads at the head of the screw are spaced from each other by more than 90 degrees, and most advantageously by about 180 degrees. Such spacing is achieved by forming the supplemental thread and the primary thread with the same pitch and locating the supplemental thread between convolutions of the primary thread and equidistant from adjacent convolutions of the primary thread.

In a presently preferred embodiment of my invention, the screw is also formed with a head having a portion adapted to receive torque to be applied to rotate the screw and an annular, tapered portion joined to the torque receiving portion and the shank of the screw. More specifically, I prefer that the annular, tapered portion of the head be frusto-conical in form, with the frustum of lesser diameter than the base being located at the screw shank and being of the same diameter as that shank. In this embodiment when the washer is mounted against the tapered portion of the head, the washer will abut the primary and supplemental termini at the end of the shank and be maintained in position on the head until the screw is ready for use.

These and other objects, features and advantages of my invention will become more apparent when considered in conjunction with a preferred embodiment of the invention, described hereinafter and illustrated in the accompanying drawings, in which.

BRIEF DESCRIPTION OF THE SEVERAL VIEWS OF THE DRAWINGS

FIG. 1 is a side elevational view of a preferred threaded fastener according to my invention;

FIG. 2 is an enlarged side elevational view showing how a scaling washer is positioned between the threads of the fastener, and FIG. 3 is a view showing the washer of FIG. 2 mounted in position on the shank of the screw at the head thereof.

DETAILED DESCRIPTION OF THE INVENTION

Referring now to the drawings, the best mode of the invention as I presently contemplate it is there illustrated. FIG. 1 shows a threaded fastener, indicated generally by reference numeral 10, according to my invention. That fastener is formed with a head 11 to which a shank 12 is joined the shank terminating in a direction away from the head in a point 13. Shank 12 is provided with threads in three areas of the shank. A primary thread 15 extends the length of the shank, from or at the point 13 to a location at the head 11.

In my preferred embodiment, two other threads are formed on the periphery of the shank 12. A secondary thread 17 is formed between convolutions of the primary thread and extends from a location at the point 13 of the screw 10 along the shank 12 in the direction of the head. As shown, secondary thread 17 is located between convolutions of the primary thread 15 and terminates at a location 18 approximately one-quarter of the distance from the point 13 to the head 11. Secondary thread 17 assists the function of the screw to be self-drilling, i.e., in forming an aperture in an object to be drilled when no such aperture has been preformed.

It is an important feature of my best mode that a different supplemental or secondary thread is provided. That supplemental thread 20 extends along the shank of the screw to a point 21 at the head 11. It also extends in the direction of point 13, but only a fairly short distance, perhaps about one-eighth of the length of shank 12, as the purpose of the supplemental thread is concentrated at the head 11. As shown, the supplemental thread 20 extends along the shank from the its terminus 21 at the head of the screw to a location 22 along the shank 12, at which the thread stops.

Further, the primary thread 15 also terminates at the head end of the shank 12. As it will be apparent that the pitch of the primary thread 15 and the supplemental thread 20 is the same, and as the supplemental thread 20 is located equidistant from adjacent convolutions of the primary thread 15, that primary thread will terminate at a location that is some 180 degrees removed from the supplemental terminus 21. Such primary terminus is on the opposite side of the shank 12 of screw 10 as viewed in FIG. 1.

The practical effect of the utilization of supplemental thread 20 is best seen in FIGS. 2 and 3. As there illustrated, a sealing washer 25 is formed with a resilient sealing element 26, normally made of natural or synthetic rubber, and a cap 27, contiguous with the scaling element. Because sealing element 26 is dimensioned so that its thickness is equal to the pitch between primary thread 15 and secondary thread 20 of the screw 10, sealing element 26 will fit between the convolutions as seen in FIG. 2. Then when the sealing washer 25 has been fully inserted on the screw 10, it will be positioned as illustrated in FIG. 3 of the drawings with the plane of the washer 25 substantially perpendicular to the axis of screw shank 12.

In the preferred embodiment illustrated in the drawings, the screw head 11 has a shape designed to cooperate with the preferred washer structure 25. Head 11 is formed with a torque-receiving portion 30 in which a conventional recess 31 is provided for receiving a torque-applying tool. Portion 30 seats against an annular flange 32 on the shank side of which is formed an annular, tapered portion 33. This tapered portion may be viewed as a conical figure having its base 34 abutting torque-receiving portion 30 at the annular flange 32 and its frustum 35 joined to the end of the shaft 12 and being of the same diameter as the shaft 12. As so structured, the washer 25 is positioned as shown in FIG. 3 with the washer cap 27 abutting the head flange 32 and the resilient sealing element 26 supported by the termini of the primary thread 15 and the supplemental thread 20. As those threads end at opposite locations on the circumference of the shank 12, washer 25 will be maintained in the position shown in FIG. 3 during shipment and handling of the screw 10 because it is there supported in a position substantially perpendicular to the axis of the shank 12 by the termini of two screw threads 15 and 20, and that support is provided at opposite sides of the screw shank. This relatively secure position of the washer is accomplished by the use of the supplemental thread 20, where in the conventional, single threaded screw the washer is maintained in position by a single terminus and therefore tends to fall away from its position normal to the shank axis, particularly during the jostling that screws receive during shipment.

By the structure illustrated and described as the presently conceived best mode of my invention, the problem of slippage of a washer or gasket from a position in which it is located at the head of the fastener has been overcome. Because a supplemental thread has been located between the threads of the primary thread, and the terminus of the supplemental thread is located directly opposite the terminus of the primary thread, those termini provide equal support for the sealing washer, thereby inhibiting axial displacement of the sealing washer during shipping and handling thereof.

It will be apparent to those of skill in this art that many alterations and modifications of the structure set forth in my preferred embodiment may be made and still fall within the broad scope of my invention. Thus, sealing washer 25 may be made entirely of a single composition rather than with a cap, and shank 12 can extend directly to the base torque receiving portion 30 of head 11 without the intermediation of frusto-conical element 33. As to all such obvious alterations and modifications, it is desired that they be included within the purview of my invention, which is to be limited only by the scope, including equivalents, of the following, appended claims.

I claim:

1. A fastener for joining an object to another structure and comprising a head having a portion adapted for receiving torque to rotate said fastener, and an annular tapered portion joined to said torque receiving portion, and a shank joined to and extending from said annular tapered portion and terminating in a point adapted to extend through a preformed aperture in said object or create such an aperture as it is rotatably forced against said object, said shank having a primary thread continuously extending along its periphery from at least a location removed from said head and ending at said annular tapered portion in a primary terminus along the circumference of said shank, said primary thread having a pitch and being spirally wound about said shank in convolutions spaced to create a continuous, unthreaded portion of said shank between said primary thread convolutions, and a supplemental thread located in at least a part of said continuous unthreaded portion of said shank between said primary thread convolutions, said supplemental thread ending at said annular tapered portion in a supplemental terminus spaced from said primary terminus along the circumference of said shank.

2. A fastener as claimed in claim 1, in which said primary and supplemental termini are spaced from each other by at least 90 degrees.

3. A fastener as claimed in claim 1, in which said primary and supplemental termini are spaced from each other by about 180 degrees.

4. A fastener as claimed in claim 1, in which said primary thread has a uniform pitch, and said supplemental thread has the same pitch.

5. A fastener as claimed in claim 4, in which said supplemental thread is located equidistant from adjacent convolutions of said primary thread.

6. A fastener as claimed in claim 1, said annular, tapered portion being substantially frusto-conical in shape with the lesser diameter frustum being located at said shank and being of substantially the same diameter as said shank.

7. The combination of a fastener for joining an object to another structure and comprising a head and a shank joined to and extending from said head and terminating in a point adapted to extend through a preformed aperture in said object or create such an aperture as it is rotatably forced against said object, said shank having a primary thread continuously extending along its periphery from at least a location removed from said head and ending at said head in a primary terminus along the circumference of said shank, said primary thread having a pitch and being spirally wound about said shank in convolutions spaced to create a continuous, unthreaded portion of said shank between said primary thread convolutions, and a supplemental thread located in said continuous unthreaded portion of said shank between said primary thread convolutions, said supplemental thread ending at said head in a supplemental terminus spaced from said primary terminus along the circumference of said shank, and a washer having an aperture therethrough and positioned with said fastener shank extending through said aperture, said washer being located at said termini of said primary and supplemental threads and being supported against axial movement in the direction of said shank point by said termini.

8. The combination claimed in claim 7, in which said head comprises a portion adapted for receiving torque to rotate said screw, and a tapered portion joined to said torque receiving portion and to said shank, said primary and supplemental termini ending at said tapered portion of said head.

9. The combination claimed in claim 8, said tapered portion being substantially frusto-conical in shape with the lesser diameter frustum being located at said shank and being of substantially the same diameter as said shank, said washer surrounding said tapered portion of said head.

10. The combination claimed in claim 7, in which said primary and secondary termini are spaced from each other along the circumference of said shank by more than 90 degrees.

11. The combination claimed in claim 10, in which said primary and second termini are spaced from each other along the circumference of said shank by about 180 degrees.

12. The combination of a fastener for joining an object to another structure and comprising a head, and a shank joined to and extending from said head and terminating in a point adapted to extend through a preformed aperture in said object or create such an aperture as it is rotatably forced against said object, said shank having a primary thread continuously extending along its periphery from at least a location removed from said head and ending at said head in a primal terminus along the circumference of said shank, said primary thread having a pitch and being spirally wound about said shank in convolutions spaced to create a continuous, unthreaded portion of said shank between said primary thread convolutions, and a supplemental thread located in said continuous unthreaded portion of said shank between said primary thread convolutions, said supplemental thread ending at said head at a supplemental terminus spaced from said primary terminus along the circumference of said shank, said head having a portion thereof to receive torque applied to rotate said screw, said torque receiving portion being joined in the direction of said shank to an outwardly extending flange to which is attached an annular, tapered portion that is substantially frusto-conical in shape with the lesser diameter frustum being located at said shank and being of substantially the same diameter as said shank, and a resilient washer having an aperture therethrough and positioned with said fastener extending through said aperture, said washer be located about said tapered portion of said head and being supported against axial movement along said shaft between said outwardly extending flange of said head and said termini of said primary and secondary threads.

* * * * *